Feb. 12, 1924.
H. P. PATHEAL
1,483,477
EXTENSION WHEEL RIM CONNECTER
Filed Feb. 15, 1923
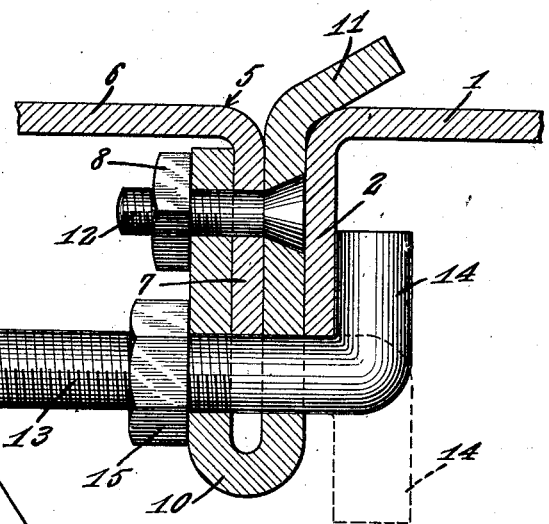
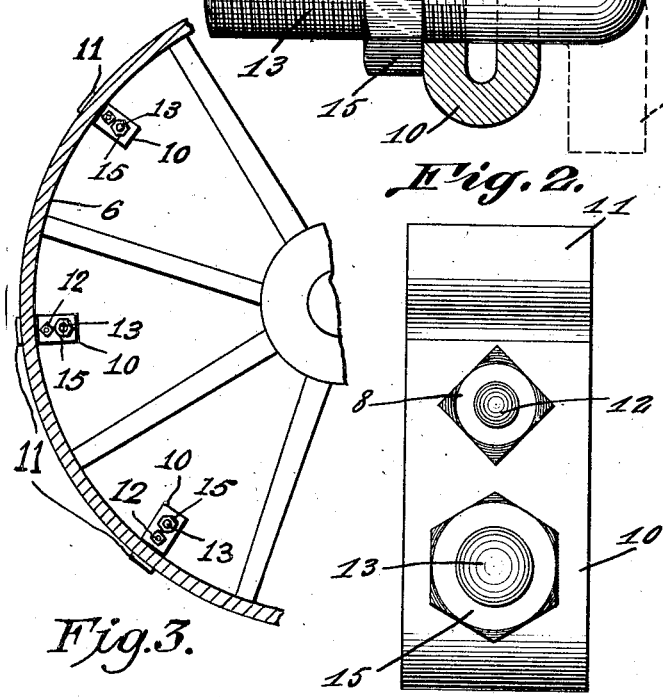
H. P. Patheal, Inventor Patented Feb. 12, 1924.

1,483,477

UNITED STATES PATENT OFFICE.

HERSCHEL P. PATHEAL, OF GREENVILLE, ILLINOIS.

EXTENSION-WHEEL-RIM CONNECTER.

Application filed February 15, 1923. Serial No. 619,179.

*To all whom it may concern:*

Be it known that I, HERSCHEL P. PATHEAL, a citizen of the United States, residing at Greenville, in the county of Bond and State of Illinois, have invented a new and useful Extension-Wheel-Rim Connecter, of which the following is a specification.

This invention relates to connecters for attaching extension rims to wheels, and more particularly to tractor wheels.

The object of the invention is to provide a connecter of this character primarily intended for use in connection with the wheels of Fordson tractors or other tractors having similar wheel construction, whereby the rim of the wheel is widened to afford greater tread surface and prevent the tractor sinking into soft ground.

Another object is to provide a connecter of this character whereby a wedging effect is produced between it and the wheel rim to which the extension is to be connected.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scoope of what is claimed without departing from the spirit of the invention.

In the accompanying drawings:—

Figure 1 represents a transverse section of a portion of a wheel rim and its extension with this improved connecter shown applied and in section, and Figure 2 is a side elevation of the connecter.

Fig. 3 is a side elevation of a portion of a wheel with the rim shown in section and having this improved connecter shown applied.

In the embodiment illustrated, a tractor wheel rim 1 is shown such as that used on a Fordson tractor, and which has an inturned right angularly extending flange 2. An extension rim 5 has a tread portion 6 to be arranged flush with the tread of the rim 1, and is provided with a right angular inturned flange 7 positioned parallel with flange 2 and which is connected with flange 2 by the connecter 10 constituting this invention.

The connecter 10 is made in the form of a substantially U-shaped clip, the free end of one leg of which is made longer than the other and is extended outwardly at an oblique angle as shown at 11 to form a rim engaging member and between which and a cooperating bolt head 14 the flange 2 of rim 1 is clamped.

The rim extension 5 has its flange 7 positioned between the legs of the clip 10 and is secured to said clip by a bolt 12, the head of which is counter-sunk in one leg of the clip, the bolt passing through both legs of the clip and through the flange 7 and which is secured by a nut 8.

The bolt 13 has a laterally extending right angular head 14 and when applied passes through the legs of the clip 10 at a point spaced inwardly from the bolt 12 in such position that the edge of flange 7 of the extension rim 5 will rest on said bolt as is shown clearly in Fig. 1. The head of the bolt engages the inner face of flange 2 of rim 1 when the device is applied so that when the nut 15 is screwed home, the flange 2 will be clampingly held between head 14 and the obliquely disposed clip end 11 which exerts a wedging effect on said flange and forces it inward against the bolt.

In the use of this improved connecter, any desired number of which may be employed for securing the extension 5 to the rim 1, said extension 5 is placed adjacent the wheel rim 1 with the clip 10 in position as shown in Fig. 1 with the bolt 13 turned so that the head 14 thereof will extend downward into the dotted line position shown in said figure. After the parts have been so located, the head 14 of the bolt is turned upwardly into the full line position shown in Fig. 1, and the nut 15 is tightened up, which draws the flange 2 against the clip 10 thereby producing a wedging effect through the action of the end 11 of clip 10. It is obvious that reversing the above action will readily detach the extension rim 5.

It is of course understood that the required number of connecters or clips 10 which are to be used in attaching the extension rim section 5 are first secured to the flange 7 of said section by the bolts 12. After this has been done, the section 5 with the connecters 10 attached thereto and with the bolts 13 extending through said connecters is placed against the flange 2 in the manner above described and the bolt heads turned into locking position after which the nuts 15 are tightened and the wheel is ready for use.

I claim:—

1. An extension wheel rim connecter comprising a U-shaped clip formed of a strip of flat metal with one end extended beyond the other and bent obliquely outward to form a wheel rim engaging member, means for connecting the legs of said clip to the flange of the extension rim to be connected and means carried by the clip to cooperate with said obliquely extending end for detachably securing the clip to a wheel rim.

2. An extension wheel rim connecter comprising a U-shaped clip having one end extending beyond the other and bent obliquely outward to form a wheel rim engaging member, a bolt extending through the legs of said clip with its head counter-sunk in one of the legs and adapted to secure a wheel rim extension thereto, another bolt extending through the legs of said clip at a point spaced inwardly from said first mentioned bolt and having a right angularly extending head to receive between it and said bent clip end, the flange of the wheel rim in connection with which it is to be used, and a nut on said bolt to tighten the bolt and clamp the wheel rim flange between its head and the clip end.

In testimony that I claim the foregoing as my own, I have hereto affixed my signature in the presence of two witnesses.

HERSCHEL P. PATHEAL.

Witnesses:
H. H. WALKER,
O. I. THOMPSON.